(12) United States Patent
Ahn et al.

(10) Patent No.: US 9,098,381 B2
(45) Date of Patent: Aug. 4, 2015

(54) MODULAR ARITHMATIC UNIT AND SECURE SYSTEM INCLUDING THE SAME

(71) Applicant: SAMSUNG ELECTRONICS CO., LTD., Suwon-Si, Gyeonggi-Do (KR)

(72) Inventors: Kyoungmoon Ahn, Seoul (KR); Jonghoon Shin, Hwaseong-si (KR); Yong Ki Lee, Hwaseong-si (KR); Ji-Su Kang, Seoul (KR); Sun-Soo Shin, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 303 days.

(21) Appl. No.: 13/734,520

(22) Filed: Jan. 4, 2013

(65) Prior Publication Data

US 2013/0311531 A1   Nov. 21, 2013

(30) Foreign Application Priority Data

May 17, 2012   (KR) .......................... 10-2012-0052602

(51) Int. Cl.
    *G06F 7/72*   (2006.01)
(52) U.S. Cl.
    CPC .. *G06F 7/72* (2013.01); *G06F 7/728* (2013.01)
(58) Field of Classification Search
    None
    See application file for complete search history.

(56) References Cited

U.S. PATENT DOCUMENTS

| | | | |
|---|---|---|---|
| 7,543,011 B2 * | 6/2009 | Yoon et al. | 708/491 |
| 8,209,369 B2 * | 6/2012 | Lee et al. | 708/491 |
| 2004/0066934 A1 | 4/2004 | Chen | |
| 2004/0179681 A1 | 9/2004 | Lee et al. | |
| 2004/0225702 A1 | 11/2004 | Son | |
| 2004/0252829 A1 * | 12/2004 | Son | 380/30 |
| 2005/0198093 A1 | 9/2005 | Son | |
| 2006/0136676 A1 | 6/2006 | Park et al. | |
| 2007/0106836 A1 | 5/2007 | Lee et al. | |
| 2009/0310408 A1 | 12/2009 | Lee et al. | |
| 2010/0082890 A1 | 4/2010 | Heo et al. | |
| 2010/0183145 A1 | 7/2010 | Ohyama | |
| 2010/0217927 A1 | 8/2010 | Song et al. | |
| 2011/0231467 A1 | 9/2011 | Ahn et al. | |
| 2012/0317159 A1 | 12/2012 | Ahn et al. | |
| 2013/0311531 A1 * | 11/2013 | Ahn et al. | 708/490 |

FOREIGN PATENT DOCUMENTS

| | | |
|---|---|---|
| JP | 2010-164721 | 7/2010 |
| KR | 10-2001-0086516 | 9/2001 |
| KR | 10-0486697 | 4/2005 |
| KR | 10-2008-0050226 | 6/2008 |
| KR | 10-0939356 | 1/2010 |

OTHER PUBLICATIONS

English Abstract for Publication No. 2010-164721.
English Abstract for Publication No. 10-2008-0050226.
English Abstract for Publication No. 10-0486697.
English Abstract for Publication No. 10-2009-0059921 (FOR 10-0939356).
English Abstract for Publication No. 10-2001-0086516.

* cited by examiner

*Primary Examiner* — David H Malzahn
(74) *Attorney, Agent, or Firm* — F. Chau & Associates, LLC

(57) ABSTRACT

A modular arithmetic unit includes a first input generator receiving first data to generate a first operand; a second input generator receiving second data to generate a second operand; an accumulator performing an accumulate/shift operation to add the first and second operands and outputting the carry and sum; a carry propagation adder adding the carry and the sum to output a result; and a data handler receiving either external data or the result and outputting the first data and the second data.

19 Claims, 16 Drawing Sheets

Fig. 15

| Case | Montgomery Multiplication | Modular Addition/Subtraction | | |
|---|---|---|---|---|
| | Case 3 | Case 3 | Case 4 | Case 5 |
| Prior Art | 3 | 3 | 3 | 2 |
| Present Invention | 2 | 2 | 2 | 1 |

MODULAR ARITHMATIC UNIT AND SECURE SYSTEM INCLUDING THE SAME

CROSS-REFERENCE TO RELATED APPLICATIONS

This U.S. non-provisional patent application claims priority under 35 U.S.C. §119 from Korean Patent Application No. 10-2012-0052602, filed on May 17, 2012 in the Korean Intellectual Property Office, the contents of which are herein incorporated by reference in their entirety.

BACKGROUND

Embodiments of the present inventive concept are directed to modular arithmetic units and secure systems including the same.

Typical examples of a public key algorithm include the RSA (Rivest-Shamir-Adleman) algorithm, which is based on the difficulty of factoring large integers, and ecliptic curve cryptography (ECC), which is based on the difficulty of finding the discrete logarithm of a random elliptic curve element with respect to a publicly known base point, known as the elliptic curve discrete logarithm problem (ECDLP). When implementing an RSA and an ECC algorithm, a fundamental operation is a modular operation and performance of RSA and ECC may depend on an implementation of the modular operation. Improving the performance of a modular arithmetic unit may improve the performance of an RSA and an ECC.

SUMMARY

Embodiments of the inventive concept provide a modular arithmetic unit. The modular arithmetic unit may include a first input generator that receives first data to generate a first operand; a second input generator that receives second data to generate a second operand; an accumulator that performs an accumulate/shift operation on the first and second operands to output a carry and sum; a carry propagation adder that adds the carry and the sum to output a result; and a data handler that receives either external data or the result and outputs the first data and the second data.

Embodiments of the inventive concept also provide a secure system. The secure system may include a central processing unit; a ROM and a RAM that store data; a crypto processor that includes a modular arithmetic unit that performs modular arithmetic; a crypto memory that stores data for the crypto processor. The modular arithmetic unit comprises a first input generator that receives first data to generate a first operand; a second input generator that receives second data to generate a second operand; an accumulator that performs an accumulate/shift operation on the first and second operands to output a carry and sum; a carry propagation adder that adds the carry and the sum to output a result; and a data handler that receives data from the crypto processor or the result from the carry propagation adder to output the first and second data. When the result value is a final result of operation, the data handler outputs m-bit data stored in data handler registers of the data handler to the crypto memory.

Embodiments of the inventive concept also provide a modular arithmetic unit. The modular arithmetic unit may include a data handler that includes a first data handler logic circuit that receives data from a plurality of inputs and shifts and outputs the data, a second data handler logic circuit that receives data from a plurality of inputs and shifts and outputs the data, a first data handler register that stores an output of the first data handler logic circuit, a second data handler register that stores an output of the first data handler logic circuit, and a data handler multiplexer that selects one of values stored in the first and second data handler registers, in which an output of the data handler multiplexer is output to a first data and a value stored in the second data handler register is output to a second data. The modular arithmetic unit may further include a first input generator that includes a first operand multiplexer that selects one of the first data and a previous first data, a first operand register that stores the selected first data, and a first operand logic that outputs a multiple of the stored first data as a first operand, and a second input generator that includes a second operand multiplexer that selects one of the second data and a previous second data, a second operand register that stores the selected second data, and a second operand logic that outputs a multiple of the stored second data as a second operand.

BRIEF DESCRIPTION OF THE FIGURES

FIG. 15 is a table that compares a modular operation result of modular arithmetic unit of the inventive concept with a modular operation result of conventional modular arithmetic unit and shows the number of memory access times occurring in a second operation.

DETAILED DESCRIPTION OF EXEMPLARY EMBODIMENTS

Figure 1:
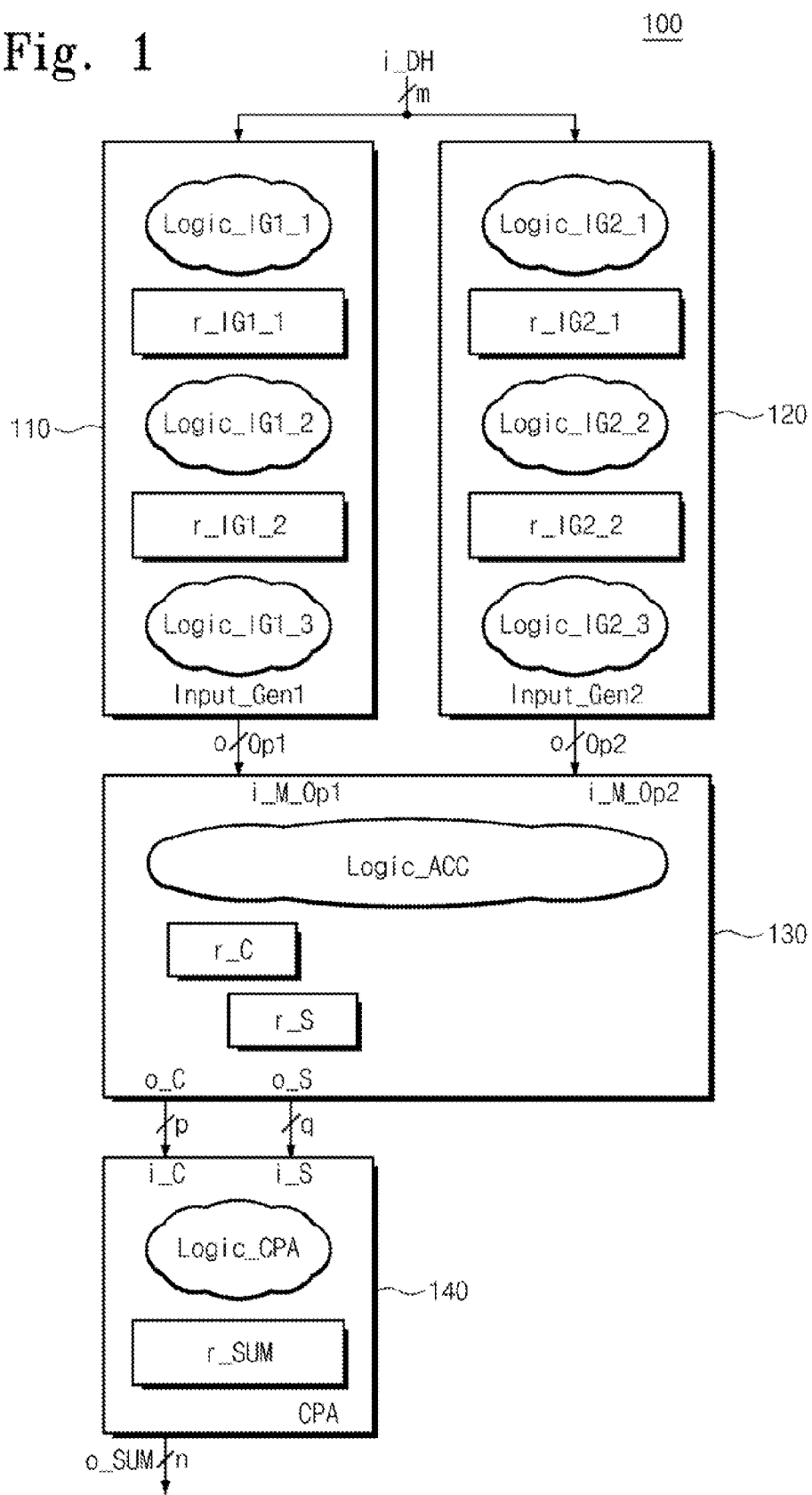
FIG. 1 is a block diagram illustrating a general modular arithmetic unit.

Exemplary embodiments of inventive concepts will be described more fully hereinafter with reference to the accompanying drawings, in which exemplary embodiments of the invention are shown. Embodiments of the inventive concept may, however, be embodied in many different forms and should not be construed as limited to the embodiments set forth herein. In the drawings, the size and relative sizes of layers and regions may be exaggerated for clarity. Like numbers refer to like elements throughout.

An effective algorithm for performing modular multiplication is the Montgomery algorithm. The Montgomery modular multiplication algorithm with respect to a radix $2^k$ may be defined as follows.

Input: $2^{r-1} < M < 2^r$, $-M < A, B < M$, where $|B| = \sum_{i=0}^{n-1} B_i 2^{ki}$ and $B_i \in \{0, 1, \ldots, 2^k - 1\}$.

Output: $S_n = A \times B \times 2^{-r} \mod M$.
1. $S_0 = 0$
2. For i = 1 to n
   2.1. $Q_i = (-1/M) \times (S_{i-1} + B_i \times A) \mod 2^k$
   2.2. $S_i = (S_{i-1} + \text{Sign}(B) \times B_i \times A + Q_i \times M)/2^k$
3. If $S_n < 0$ then $S_n = S_n + M$ Modular addition/subtraction may be defined as follows.

Input: integer $$M = \sum_{i=0}^{n-1} M_i 2^{ki} \text{ and } M_i \in \{0, 1, \ldots, 2^k - 1\};$$

$$|A| = \sum_{i=0}^{n-1} A_i 2^{ki} \text{ and } A_i \in \{0, 1, \ldots, 2^k - 1\};$$

$$|B| = \sum_{i=0}^{n-1} B_i 2^{ki} \text{ and } B_i \in \{0, 1, \ldots, 2^k - 1\},$$

with $-M \leq A, B < M$.

Output: $S = A \pm B \mod M$
1. $S = A \pm B + qM$ (Reduction coefficient $q \in \{-1, 0, 1\}$)
2. if $S < 0$ then $S = S + M$ FIG. 1 is a block diagram illustrating a general modular arithmetic unit 100 that can perform Montgomery multiplication and modular addition/subtraction operations. Referring to FIG. 1, a modular arithmetic unit 100 includes a first input generator 110, a second input generator 120, an accumulator 130 and a carrier propagation adder 140.

The first and second input generators 110 and 120 receive an m-bit data i_DH necessary for an operation from an external storage device (e.g., a memory device) and output o-bit operands (Op1 or Op2) having a form suitable for an operation.

The first input generator 110 includes three logical circuits Logic_IG1_1, Logic_IG1_2 and Logic_IG1_3 and two registers r_IG1_1 and r_IG1_2.

The Logic_IG1_1 stores m-bit data i_DH received from the external storage device in the r_IG1_1. The r_IG1_1 is an input register that stores input data i_DH received from outside. The Logic_IG1_2 stores data of the r_IG1_1 in the r_IG1_2. The r_IG1_2 is an input register that stores values multiplied by the Logic_IG1_3. The Logic_IG1_3 outputs a multiple of the value stored in the r_IG1_2 according to an operation.

The second input generator 120 has the same structure as the first input generator 110.

Each operation of the first and second input generators 110 and 120 is subdivided into a Montgomery multiplication (A×B mod M) operation and a modular addition/subtraction (A±B mod M) operation.

When performing a Montgomery multiplication operation, the first input generator 110 outputs a product of multiplicand A by multiplier B and the second input generator 120 outputs a product of modulus M by a share value Q, defined in step 2.1 of the Montgomery modular multiplication operation defined above.

When performing a modular addition/subtraction operation, the first input generator 110 outputs a product of '×1' or '×(-1)' and the summand/minuend (A) and addend/subtrahend (B) and the second input generator 120 outputs M or -M to perform a modular operation with respect to A±B.

The accumulator 130 performs an accumulate/shift operation. The accumulator 130 includes an accumulation logical circuit Logic_ACC and registers r_C and r_S. The Logic_ACC receives operands Op1 and Op2 from the first and second input generators 110 and 120 through input ports i_M_Op1 and i_M_Op2 and performs an accumulate/shift operation using the received operands Op1 and Op2. The register r_C stores carry o_C and the register r_S stores sum o_S.

The carrier propagation adder 140 receives result values o_C and o_S in CSA form (CARRY, SUM) generated from the accumulator 130 to generate a final result in CPA form (SUM). The carrier propagation adder 140 includes an adder Logic_CPA and a register r_SUM. The adder 140 performs addition. The register r_SUM stores a result value calculated in the adder Logic-CPA and outputs a result value of n-bit to an external device through an output port o_SUM.

An operation of the modular arithmetic unit 100 with respect to a Montgomery multiplication operation and a modular addition/subtraction operation is as follows.

Montgomery Multiplication Operation

When performing a Montgomery multiplication operation, an operation of the modular arithmetic unit 100 may be divided into three cases.

$$S_1 = A_1 \times B_1 \mod M. \qquad \text{Case 1:}$$

Case 1 corresponds to a case in which input values of a current Montgomery multiplication operation are different from input values used in a previous operation. When accessing data from a memory, the number of memory accesses with respect to an input value varies depending on the size of access. For this reason, the number of input/output values is considered to be the number of memory accesses regardless of the size of memory access. Thus, in the case 1, a total of four memory accesses are needed to load an input value from a memory and store an output value.

Figure 2:
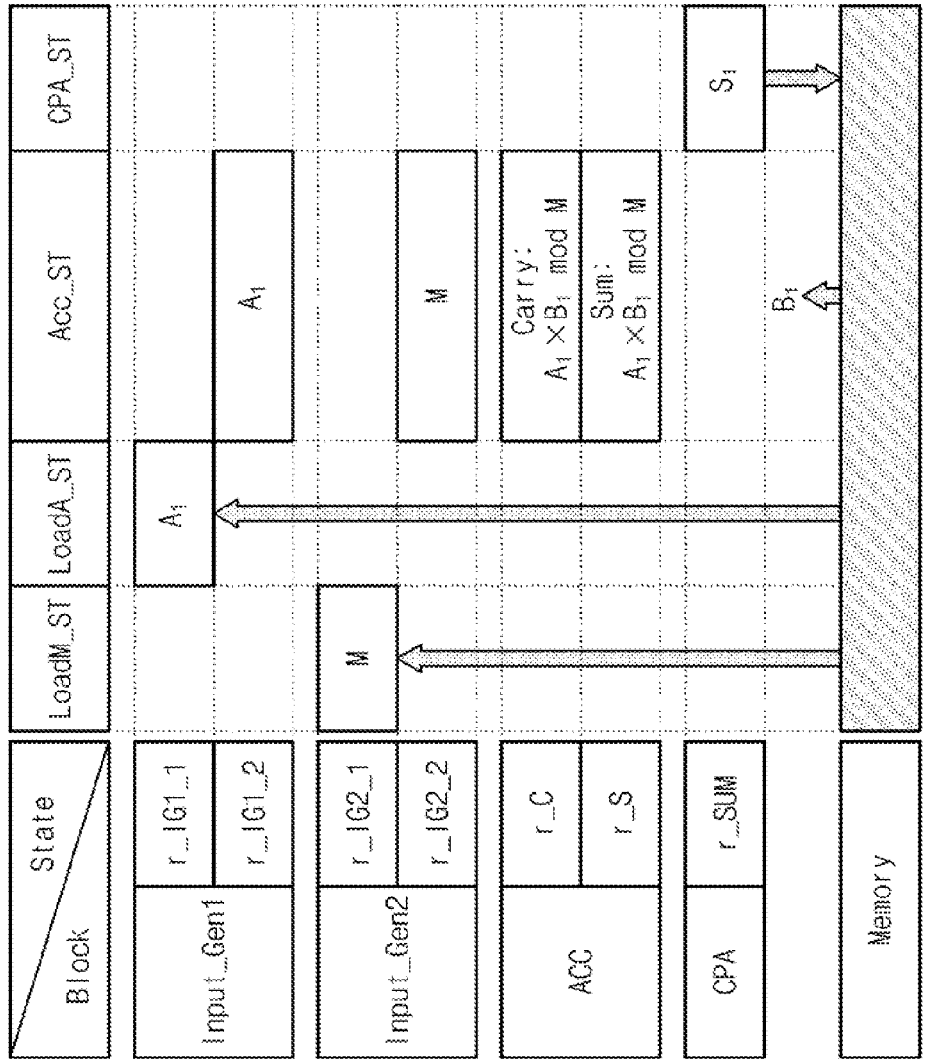
FIG. 2 illustrates case 1 of a modular multiplication operation in the modular arithmetic unit illustrated in FIG. 1.

FIG. 2 illustrates a modular multiplication operation corresponding to case 1. The states illustrated at the top of FIG.

2 represent state transitions over time. LoadM_ST is a state of loading a modulus M from memory into the r_IG2_1 register of the second input generator 120. LoadA_ST is a state of loading $A_1$ from memory into the r_IG1_1 register of the first input generator 110. Acc_ST is a state of loading $B_1$ from memory and simultaneously performing an accumulate/shift operation on the $A_1$ and $B_1$ operands modulo M. CPA_ST is a state of generating input values $S_1$ in CSA form as a final result in CPA form to output to memory.

$$S_1 = A_1 \times B_1 \bmod M \text{ and } S_2 = A_2 \times B_2 \bmod M \qquad \text{Case 2:}$$

When performing the RSA and ECC algorithms, a series of Montgomery multiplication operations and modular addition/subtraction operations is performed using the same modulus M. In case 2, when performing successive Montgomery multiplication operations ($1^{st}$ operation and $2^{nd}$ operation), input values except the modulus are changed. In the $2^{nd}$ operation, the total number of memory accesses is three.

Figure 3:
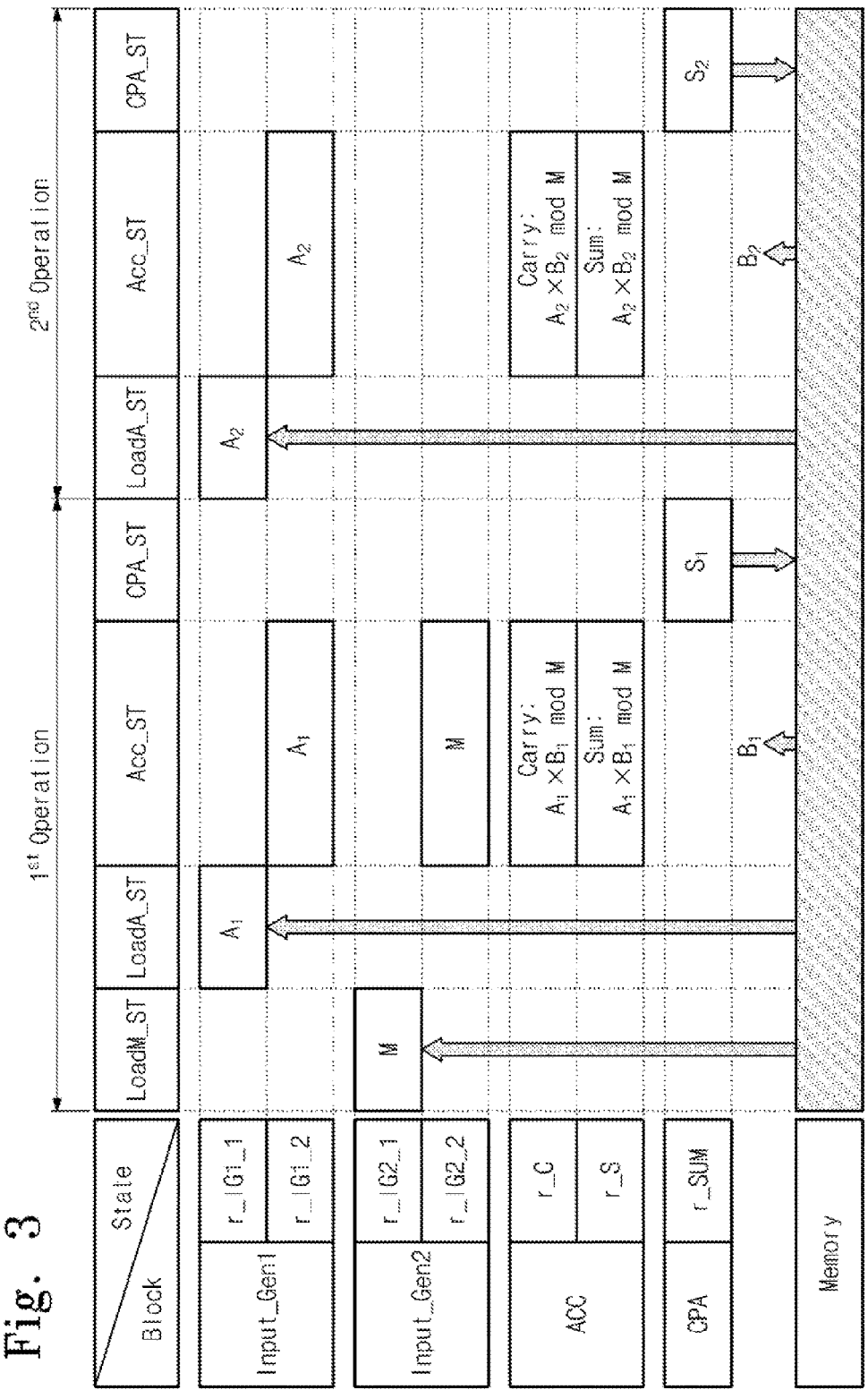
FIG. 3 illustrates case 2 of a modular multiplication operation in the modular arithmetic unit illustrated in FIG. 1.

FIG. 3 illustrates a modular multiplication operation corresponding to case 2. The state descriptions of the states labeled in FIG. 3 are similar to identical states in FIG. 2, and thus a repetitive description thereof will be omitted.

$$S_1 = A_1 \times B_1 \bmod M \text{ and } S_2' = S_1 \times B_2 \bmod M. \qquad \text{Case 3:}$$

Figure 4:
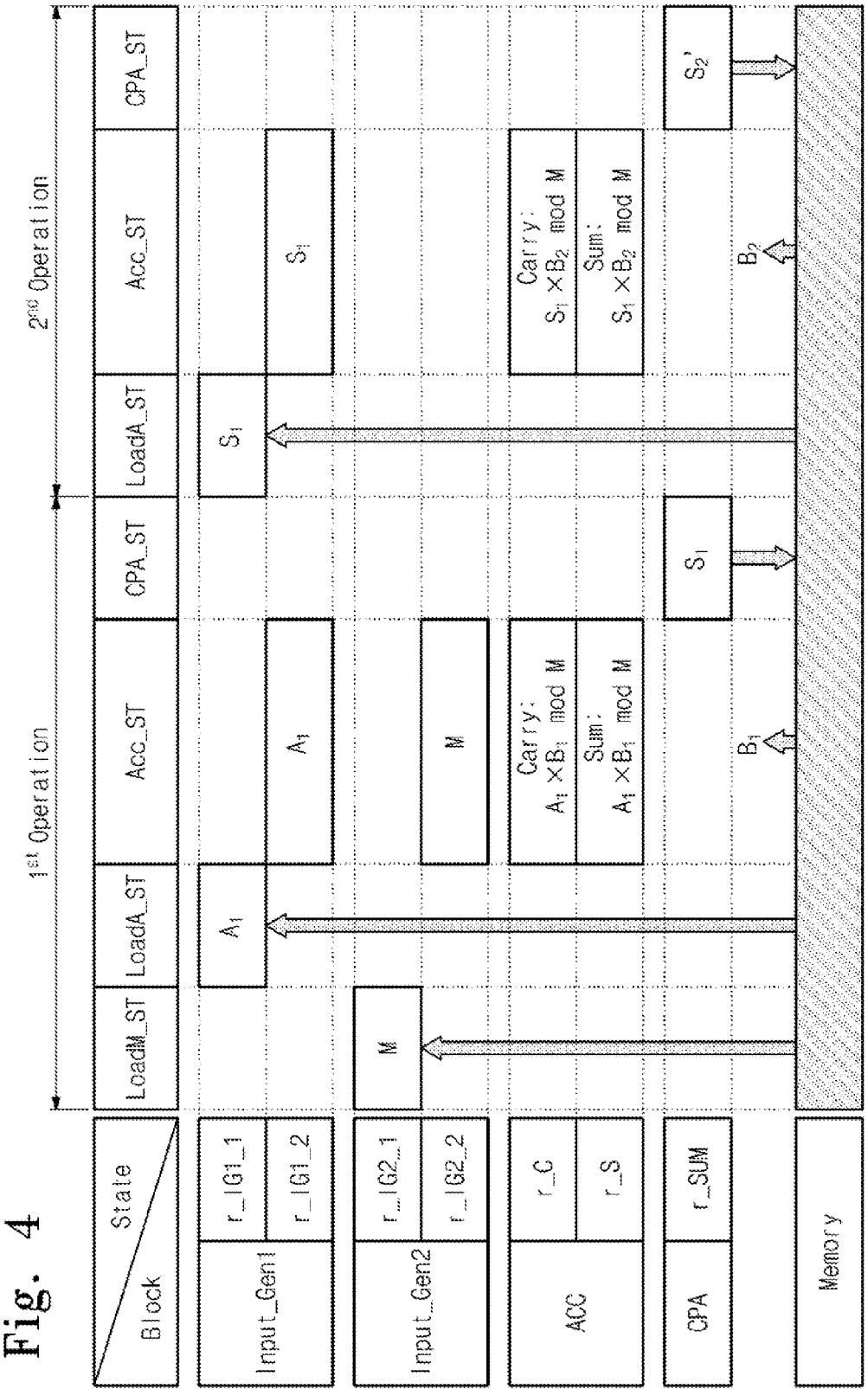
FIG. 4 illustrates case 3 of a modular multiplication operation in the modular arithmetic unit illustrated in FIG. 1.

In case 3, when performing successive Montgomery multiplication operations, the modulus M does not change and a previous result value may be used as a multiplicand. In the $2^{nd}$ operation, the total number of memory accesses is three. FIG. 4 illustrates a modular multiplication operation corresponding to case 3. The state descriptions of the states labeled in FIG. 4 are similar to identical states in FIG. 2, and thus a repetitive description thereof will be omitted.

Modular Addition/Subtraction Operation

A modular addition/subtraction operation may be divided into five cases.

$$S_1 = A_1 \pm B_1 \bmod M. \qquad \text{Case 1:}$$

Figure 5:
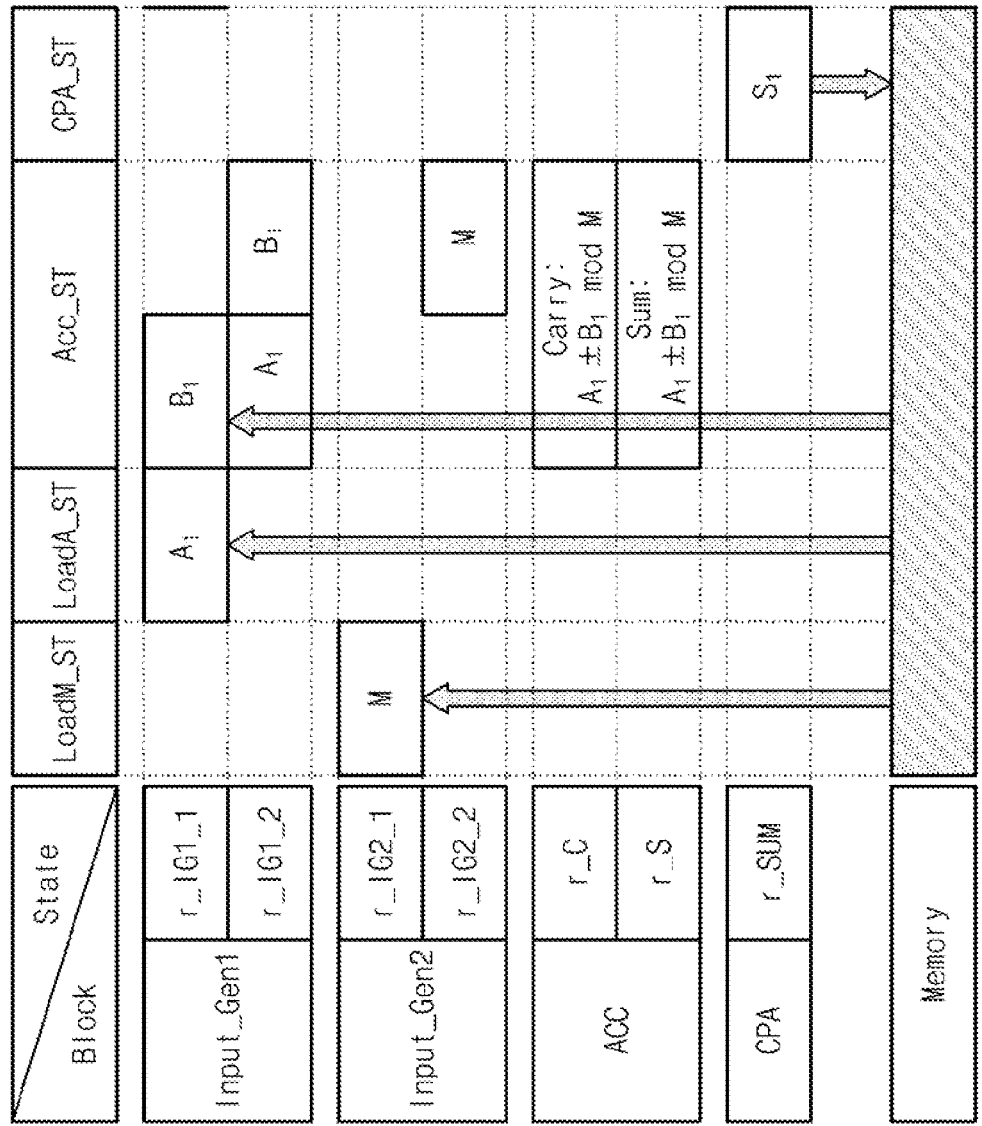
FIG. 5 illustrates case 1 of a modular addition/subtraction operation in the modular arithmetic unit illustrated in FIG. 1.

In case 1, input values of a current modular addition/subtraction operation are different from input values used in a previous operation. The total number of memory accesses is four. FIG. 5 illustrates a modular addition/subtraction operation corresponding to case 1. LoadM_ST is a state of loading a modulus M from memory into the r_IG2_1 register of the second input generator 120. LoadA_ST is a state of loading $A_1$ from memory into the r_IG1_1 register of the first input generator 110. Acc_ST is a state of simultaneously loading $B_1$ from memory into the r_IG1_1 register while performing a modular addition/subtraction operation on the $A_1$, $B_1$ and M operands. CPA_ST is a state of generating input values $S_1$ in CSA form as a final result in CPA form to output to memory.

$$S_1 = A_1 \pm B_1 \bmod M \text{ and } S_2 = A_2 \pm B_2 \bmod M \qquad \text{Case 2:}$$

Figure 6:
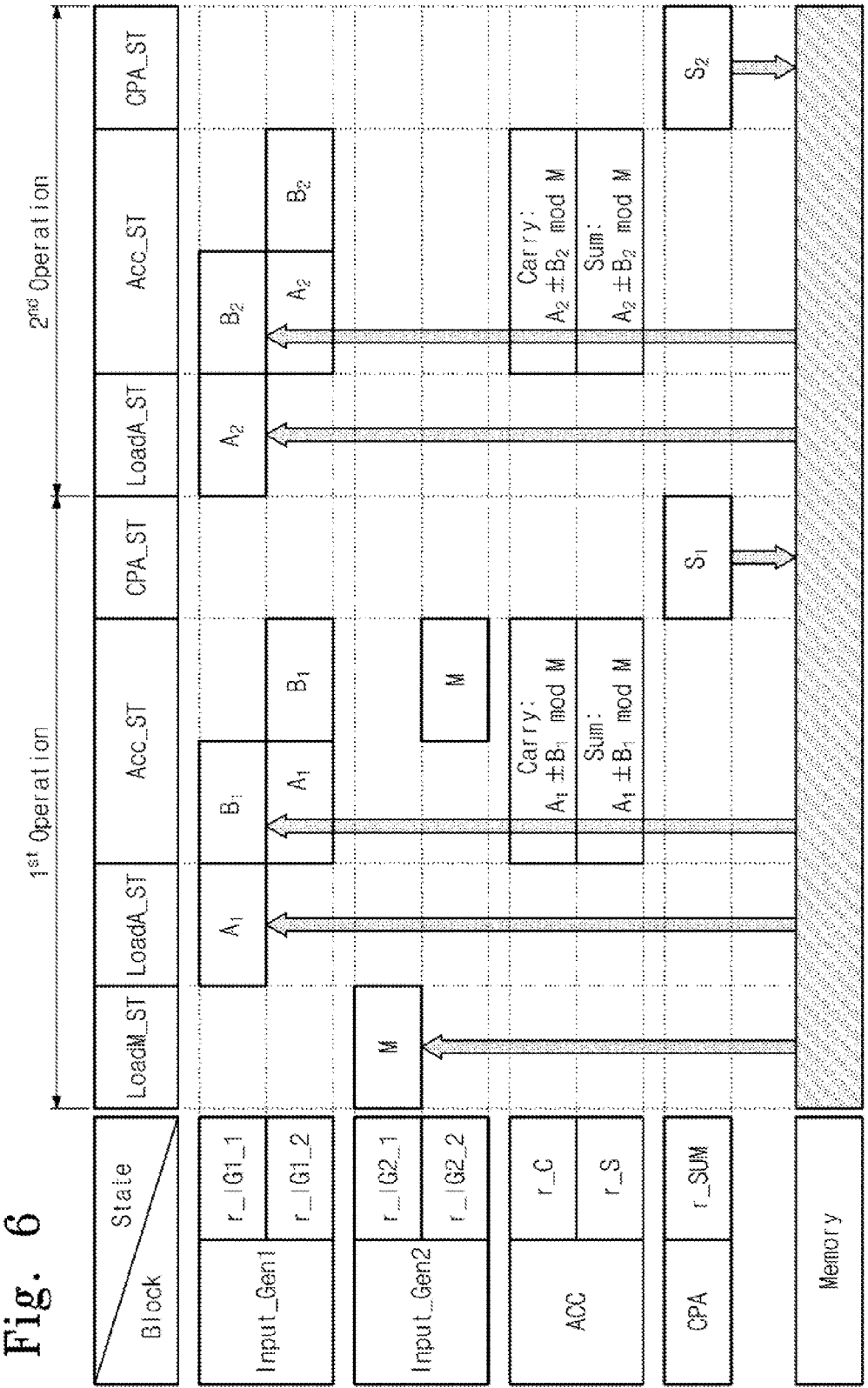
FIG. 6 illustrates case 2 of a modular addition/subtraction operation in the modular arithmetic unit illustrated in FIG. 1.

In case 2, when performing the modular addition/subtraction operations, input values except the modulus are changed. In a $2^{nd}$ operation, the total number of memory accesses is three. FIG. 6 illustrates a modular addition/subtraction operation corresponding to case 2. The state descriptions of the states labeled in FIG. 6 are similar to identical states in FIG. 5, and thus a repetitive description thereof will be omitted.

$$S_1 = A_1 \pm B_1 \bmod M \text{ and } S_2' = S_1 \pm B_2 \bmod M. \qquad \text{Case 3:}$$

Figure 7:
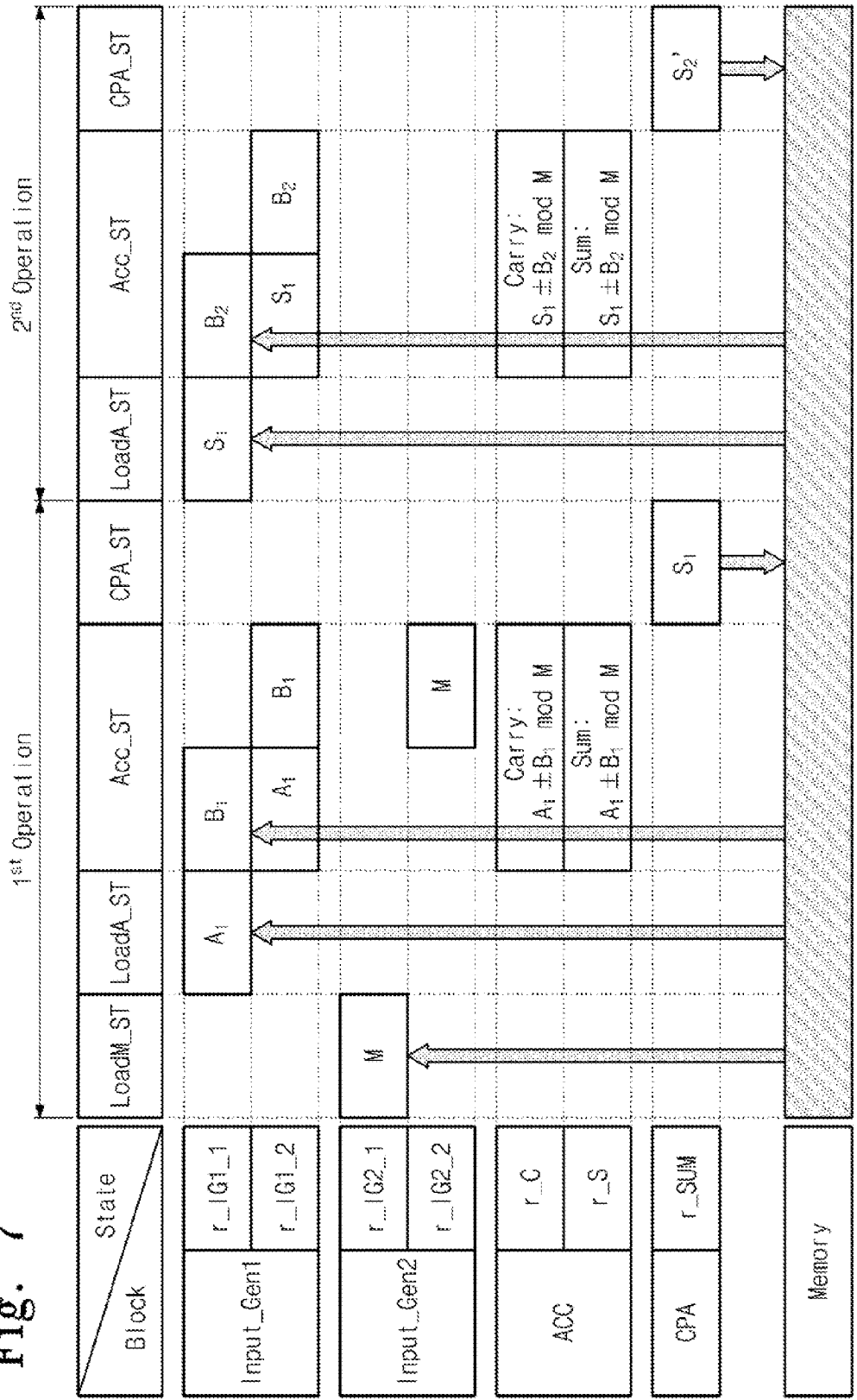
FIG. 7 illustrates case 3 of a modular addition/subtraction operation in the modular arithmetic unit illustrated in FIG. 1.

In case 3, when performing successive modular addition/subtraction operations, the modulus does not change and a previous operation result may be used as a summand or minuend. In a $2^{nd}$ operation, the total number of memory accesses is 3. FIG. 7 illustrates a modular addition/subtraction operation corresponding to case 3. The state descriptions of the states labeled in FIG. 7 are similar to identical states in FIG. 5, and thus a repetitive description thereof will be omitted.

$$S_1 = A_1 \pm B_1 \bmod M \text{ and } S_2'' = A_2 \pm S_1 \bmod M. \qquad \text{Case 4:}$$

Figure 8:
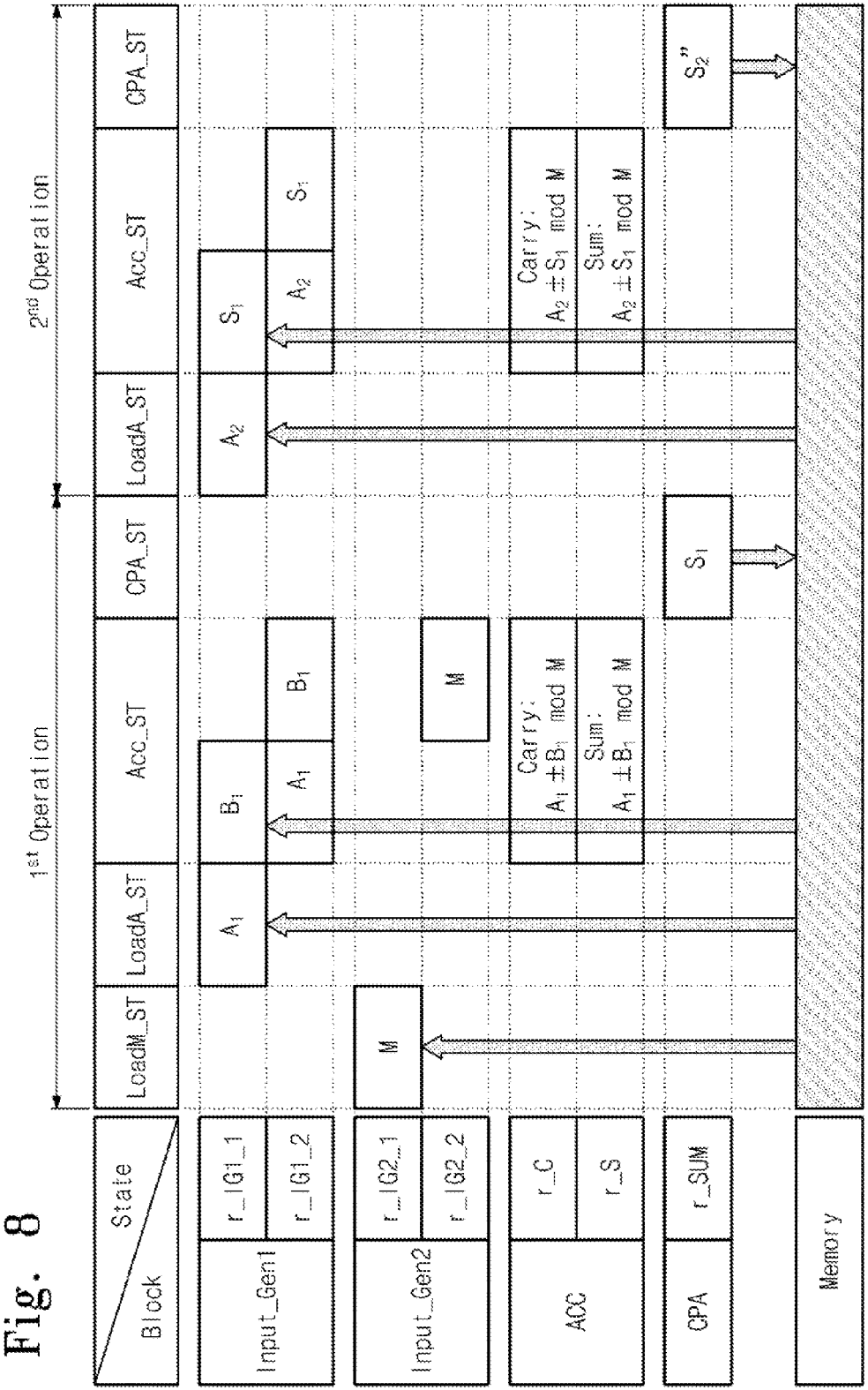
FIG. 8 illustrates case 4 of a modular addition/subtraction operation in the modular arithmetic unit illustrated in FIG. 1.

In case 4, when performing successive modular addition/subtraction operations, the modulus does not change and a previous operation result may be used as addend or subtrahend. In a $2^{nd}$ operation, the total number of memory accesses is 3. FIG. 8 illustrates a modular addition/subtraction operation corresponding to case 4. The state descriptions of the states labeled in FIG. 8 are similar to identical states in FIG. 5, and thus a repetitive description thereof will be omitted.

$$S_1 = A_1 \pm B_1 \bmod M \text{ and } S_2''' = S_1 \pm S_1 \bmod M. \qquad \text{Case 5:}$$

Figure 9:
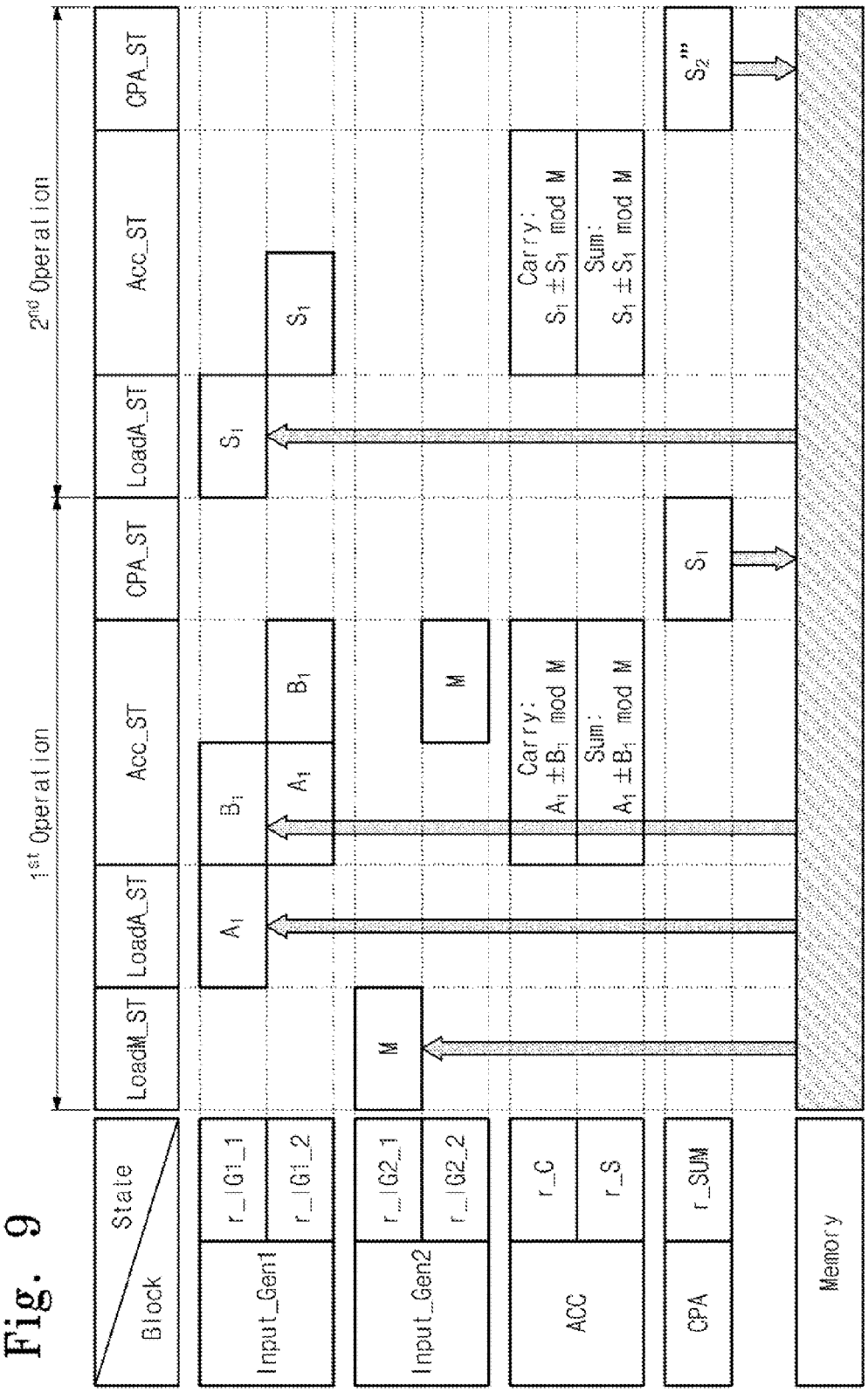
FIG. 9 illustrates case 5 of a modular addition/subtraction operation in the modular arithmetic unit illustrated in FIG. 1.

In case 5, when performing successive modular addition/subtraction operations, the modulus does not change and a previous operation result may be used as summand/addend or minuend/subtrahend. In a $2^{nd}$ operation, the total number of memory accesses is 2. FIG. 9 illustrates a modular addition/subtraction operation corresponding to case 5. The state descriptions of the states labeled in FIG. 9 are similar to identical states in FIG. 5, and thus a repetitive description thereof will be omitted.

A data path of the modular arithmetic unit 100 illustrated in FIG. 1 is fixed to one direction. That is, since registers are serially arranged, a flow of data is always fixed. The first and second input generators 110 and 120 store modulus M in a register r-IG2_2 to reduce the number of loads from memory if the same modulus M is being used. Because of this, a register r_IG2_1 may be used when loading modulus M from memory. As a result, the remaining input values may be processed in the first input generator 110. This may hinder an effective implementation of the operation. Since the register r_SUM of the carrier propagation adder 140 is used to output a CPA operation, which is a part of the whole operation, and a result value, a usage efficiency of the register r_SUM of the carrier propagation adder 140 is decreased.

In the embodiments of the Montgomery multiplication operation and the modular addition/subtraction operation described above, the general modular arithmetic unit 100 receives a previous operation result from memory, which may increase the number of memory accesses and possibly expose the data to the outside. To prevent this, a result value can be stored by adding a register to the modular arithmetic unit. However, this may increase power consumption and of the number of gates.

Embodiments of the inventive concept provide an efficient modular arithmetic unit that can reduce the number of memory accesses and increase operating speed by a simple hardware addition.

Figure 10:
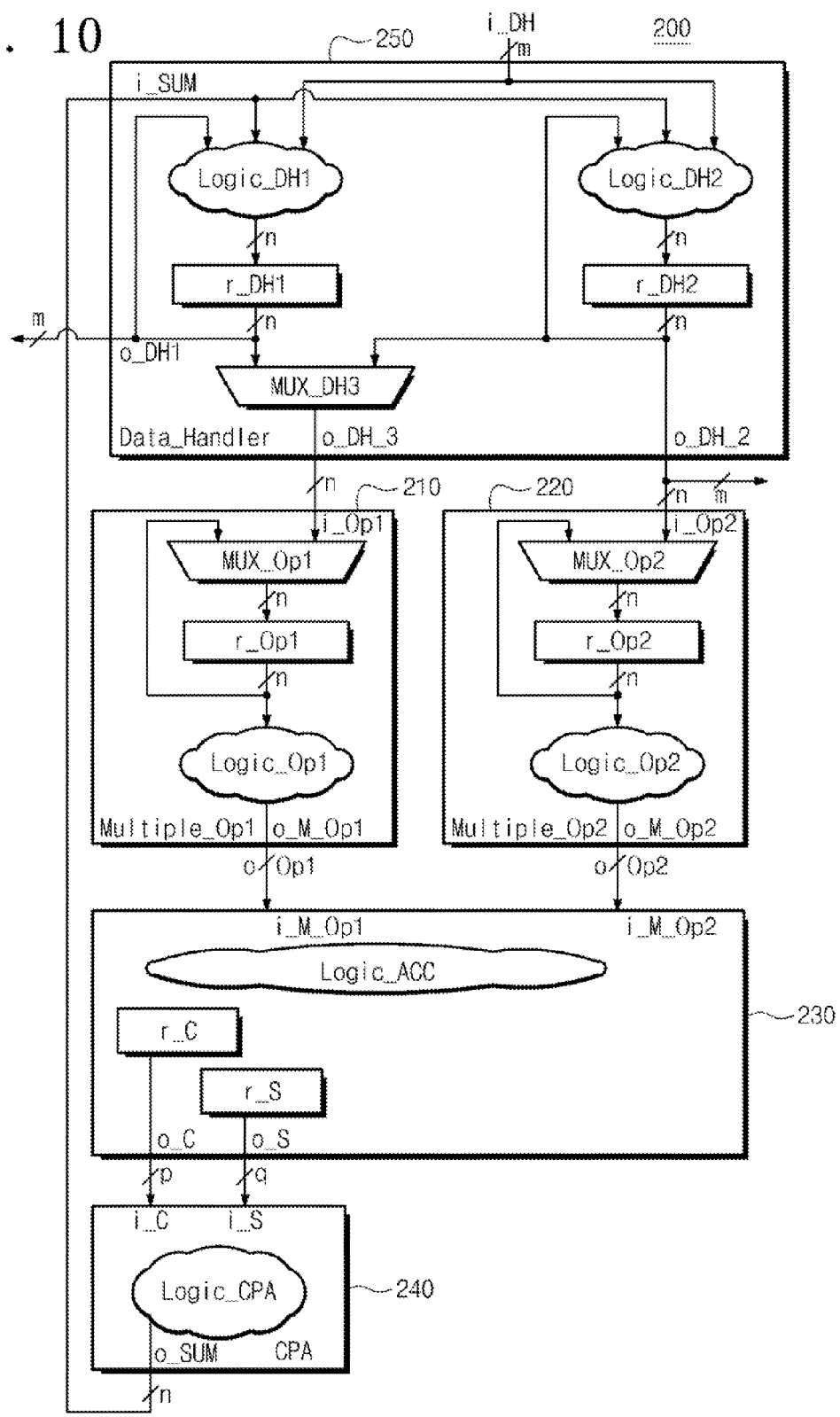
FIG. 10 is a block diagram illustrating a modular arithmetic unit in accordance with embodiments of the inventive concept.

FIG. 10 is a block diagram illustrating a modular arithmetic unit 200 in accordance with embodiments of the inventive concept. Referring to FIG. 10, a modular arithmetic unit 200 includes a first input generator 210, a second input generator 220, an accumulator 230, a carrier propagation adder 240 and a data handler 250.

The first and second input generators 210 and 220 receive n-bit data from the data handler 250 through input ports i_Op1 and i_Op2 and output output values having a form suitable for the accumulator 230 through output ports o_M_Op1 and o_M_Op1.

The first input generator 210 includes a first operand multiplexer MUX_Op1, a first operand register r_Op1 and a first operand logic Logic_Op1. The first operand multiplexer MUX_Op1 determines whether to update data in the first operand register r_Op1 with data received from an output port o_DH3 of the data handler 250. The first operand multiplexer MUX_Op1 selects either the data received from the output port o_DH3 of the data handler 250 or a value stored in the first operand register r_Op1. The first operand register r_Op1 stores a value to be multiplied by the first operand logic Logic_Op1. The first operand logic Logic_Op1 outputs a product of the value stored in the first operand register r_Op1 according to an operation.

The second input generator 220 includes a second operand multiplexer MUX_Op2, a second operand register r_Op1 and a second operand logic Logic_Op2. The second operand multiplexer MUX_Op1 determines whether to update data in the second operand register r_Op1 with data received from an output port o_DH2 of the data handler 250. The second operand multiplexer MUX_Op2 selects either the data received from the output port o_DH2 of the data handler 250 or a value stored in the second operand register r_Op2. The second operand register r_Op2 stores a value to be multiplied by the second operand logic Logic_Op2. The second operand logic Logic_Op2 outputs a product of the value stored in the second operand register r_Op2 according to an operation.

Each operation of the first and second input generators 210 and 220 is divided based on whether a Montgomery multiplication operation (A×B mod M) or a modular addition/subtraction operation (A±B mod M) is being performed.

To perform a Montgomery multiplication operation, the first input generator 210 outputs a product of multiplicand A by multiplier B to a first operand Op1 and the second input generator 220 outputs a product of modulus M by share value Q to a second operand Op2.

To perform a modular addition/subtraction operation with respect to A±, the first input generator 210 outputs a product of '×1' or '×(−1)' with respect to summand/minuend (A) and addend/subtrahend (B) to the first operand Op1 and the second input generator 220 outputs M or −M to the second operand Op2B.

The accumulator 230 receives the first and second operands Op1 and Op2 to perform an accumulate/shift operation. The accumulator 230 includes an accumulation logic circuit Logic_ACC, a carry register r_C and a sum register r_S.

The accumulation logic circuit Logic_ACC receives the first and second operands Op1 and Op2 through input ports i_M_Op1 and i_M_Op2 to perform an accumulate/shift operation. The carry register r_C or the sum register r_S stores an intermediate result in CSA form (CARRY, SUM) and an output value.

The carry propagation adder 240 receives result values in CSA form (CARRY, SUM) output from the accumulator 230 to generate a final result in CPA form (SUM). In particular, the carry propagation adder 240 receives a p-bit carry value through an input port i_C i and a q-bit sum value through an input port i_S. The carry propagation adder 240 includes carry propagation adding logic Logic_CPA.

The carry propagation adding logic Logic_CPA is an adder that outputs an n-bit result value through an output port o_SUM. The n-bit result value is stored in first and second data handler registers r_DH1 and r_DH2 of the data handler 250.

The data handler 250 receives input values needed for an operation from memory, outputs an operation result and stores data needed for further operations.

The data handler 250 includes a first data handler logic circuit Logic_DH1, a second data handler logic circuit Logic_DH2, a first data handler register r_DH1, a second data handler register r_DH2 and a data handler multiplexer MUX_DH3.

The first and second handler logic circuits Logic_DH1 and Logic_DH2 store m-bit data i_DH received from a memory in the first and second data handler registers r_DH1 and r_DH2, store a result value of the carry propagation adding logic circuit Logic_CPA of the carry propagation adder 240 in the first and second data handler registers r_DH1 and r_DH2, shift values of the first and second data handler registers r_DH1 and r_DH2 by m-bits, and store the shifted values in the first and second data handler registers r_DH1 and r_DH2 again.

The first and second data handler registers r_DH1 and r_DH2 store values received from the first and second handler logic circuits Logic_DH1 and Logic_DH2.

If values stored in the first or second data handler registers r_DH1 and r_DH2 are used in an operation, the n-bit values stored in the first or second data handler registers r_DH1 and r_DH2 selected by the data handler multiplexer MUX_DH3 are output through the output port o_DH3. In addition, values stored in the second data handler register r_DH2 are output through the output port o_DH2. If values stored in the first or second data handler registers r_DH1 and r_DH2 are an operation result, the values are shifted by m-bits by the first and second handler logic circuits Logic_DH1 and Logic_DH2 and the shifted m-bit values are output through the output port o_DH1 or the output port o_DH2.

The data handler 250 of the modular arithmetic unit 200 has the registers r_DH1 and r_DH2 arranged in parallel to store result values received from the output port o-SUM of the carry propagation adder 240, which reduces a gate count and improves hardware usage and performance.

A modular arithmetic unit 200 has increased hardware usage and reduced hardware size. Since the general modular arithmetic unit 100 processes the modulus M in the second input generator 120, the first input generator 110 processes the remaining inputs. That is, the fixed data paths of the input generators 110 and 120 may limit effective operation of the registers. Also, since different registers are used in the input part and output part, hardware is wasted.

In a modular arithmetic unit 200 of an embodiment of the inventive concept, data input/output and data storage operations are performed in the data handler 250, and arithmetic operations are performed in the first and second input generators 210 and 220, the accumulator 230 and the carry propagation adder 240. To perform the input/output and data storage operations, the data handler 250 includes parallel registers r_DH1 and r_DH2. By having parallel registers r_DH1 and r_DH2, the registers can be used for input, output or temporary storage as the need arises.

The data handler registers r_DH1 and r_DH2 store output values of the data load, data shift, and data store operations performed by the data handler logic circuits Logic_DH1 and Logic_HD2, store input data for the data handler multiplexer MUX_DH3 that determines an output value to be output through the output port o_DH3 to the first input generator 210, store output data to be output through the output port o_DH2 to the second input generator 220, output an operation result, or store data for an operation to be executed immediately or later.

The data handler registers r_DH1 and r_DH2 combine register functions which were previously separate for input or output and may also temporarily store data. Thus, register usage is increased. Further, the gate count is reduced by removing a register in the carry propagation adder 240. As a result, power consumption can be reduced.

In addition, operating speed may be improved. Since the data handler registers r_DH1 and r_DH2 of the data handler 250 can store data for a next operation, the number of memory accesses can be reduced, which may also improve operating speed.

Power consumption may be reduced. In a modular arithmetic unit 200 of an embodiment of the inventive concept, the number of memory accesses can be reduced by storing a previous operation result or frequently used data in the data handler registers r_DH1 and r_DH2. This means that logic and memory in connection with a memory access are not toggled. That is, power consumption is reduced by the reduction of memory accesses, which enables the production of low power hardware.

Outside attacks are also more challenging. The reduction of memory accesses reduces the number of times data is externally exposed. If there is frequent data movement between memory and a modular arithmetic unit in a cryptosystem such as RSA and ECC, the data may likely be a target for an attacker. The modular arithmetic unit 200 reduces attack possibilities in advance by removing unnecessary data movement. As a result, safer hardware can be realized.

How an operating speed of the modular arithmetic unit 200 may be improved is described as follows.

Figure 11:
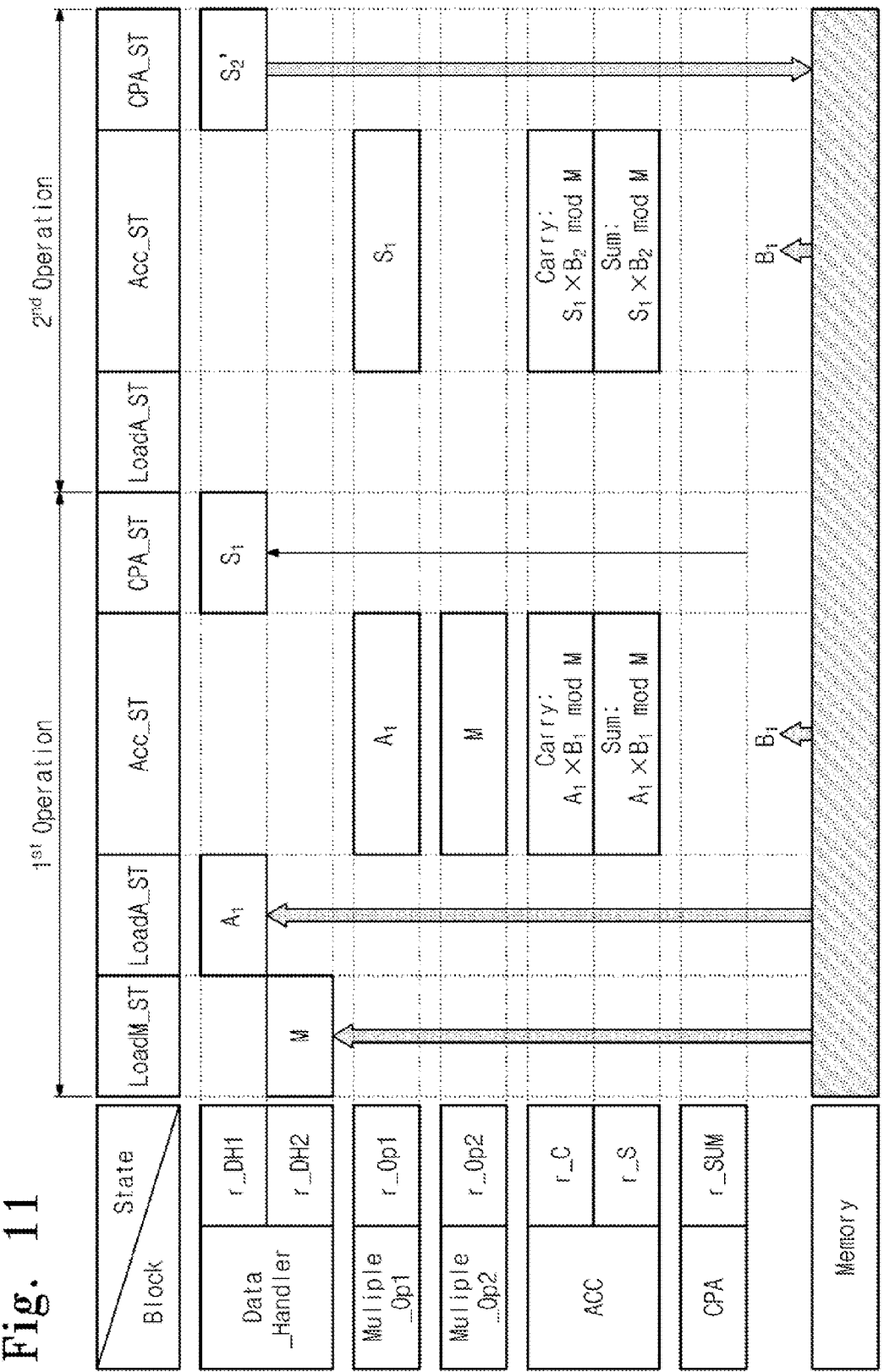
FIG. 11 illustrates case 3 of a modular multiplication operation in the modular arithmetic unit illustrated in FIG. 10.

FIG. 11 illustrates case 3 of modular multiplication in the modular arithmetic unit 200 illustrated in FIG. 10. Referring to FIG. 11, in a $1^{st}$ operation, LoadM_ST is a state of loading a modulus M from memory into the r_DH2 register of the data handler 250. LoadA_ST is a state of loading $A_1$ from memory into the r_DH1 register of the data handler 250. Acc_ST is a state of loading $B_1$ from memory and simultaneously performing an accumulate/shift operation on the $A_1$ and $B_1$ operands modulo M. CPA_ST is a state of generating input values $S_1$ in CSA form as a final result in CPA form to output to the data handler 250. Thus, a result value of the carry propagation adder 240 is not output to a memory but rather is stored in the first data handler register r_HD1 for a $2^{nd}$ operation. In the $2^{nd}$ operation, an operation begins without a memory access to $S_1$ and there are two required memory accesses for the operation. The operation of the Acc_ST state of the second operation is similar to that of the first operation, except that the S1 operand is already stored in a register of the data handler 250, and thus there is no need for a memory access. In CPA_ST of the $1^{st}$ operation, the cycles consumed are those that generate a result value in CPA form and those that store a result value in the first data handler register r_DH1.

In the LoadA_ST of the $2^{nd}$ operation, since an input value needed for the operation is stored in the first data handler register r_DH1, no memory access cycle is consumed. Thus, the modular arithmetic unit 200 can improve operating speed by internally storing a result value and reducing the number of memory accesses by using internally stored data.

In addition, the number of memory accesses may be reduced in the modular arithmetic unit 200 when performing modular addition/subtraction operations of case 3, case 4 and case 5.

Figure 12:
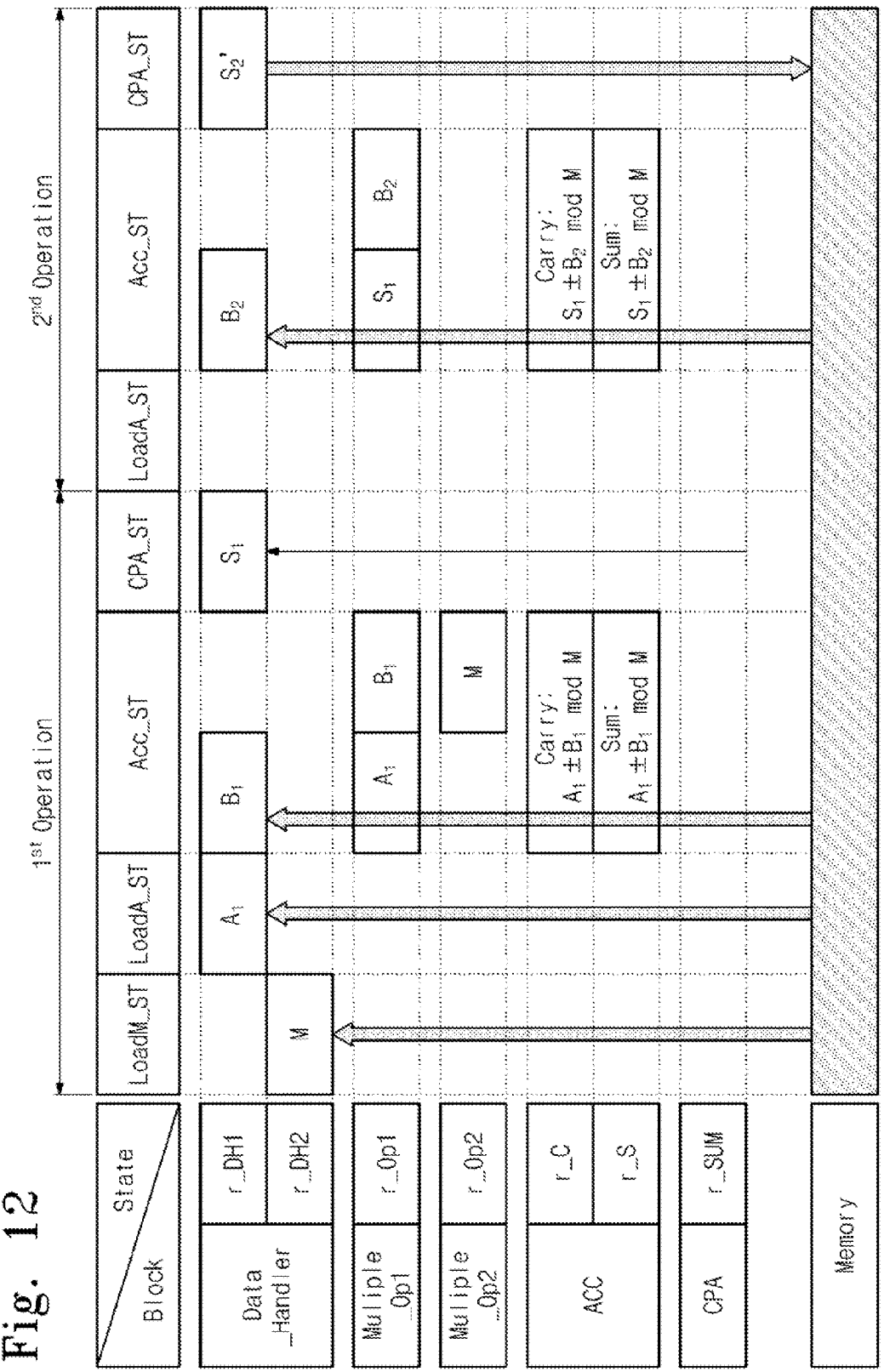
FIG. 12 illustrates case 3 of a modular addition/subtraction operation in the modular arithmetic unit illustrated in FIG. 10.

FIG. 12 illustrates case 3 of the modular addition/subtraction operation in the modular arithmetic unit 200 illustrated in FIG. 10. Case 3 includes successive modular addition/subtraction operations $S_1=A_1\pm B_1$ mod M and $S_2'=S_1\pm B_2$ and M. Except for loading the $B_1$ and $B_2$ operands from memory into the r_DH1 register of the data handler 250 during the Acc_ST state, the state descriptions of the remaining states labeled in FIG. 12 are similar to identical states in FIG. 11, and thus a repetitive description thereof will be omitted.

Figure 13:
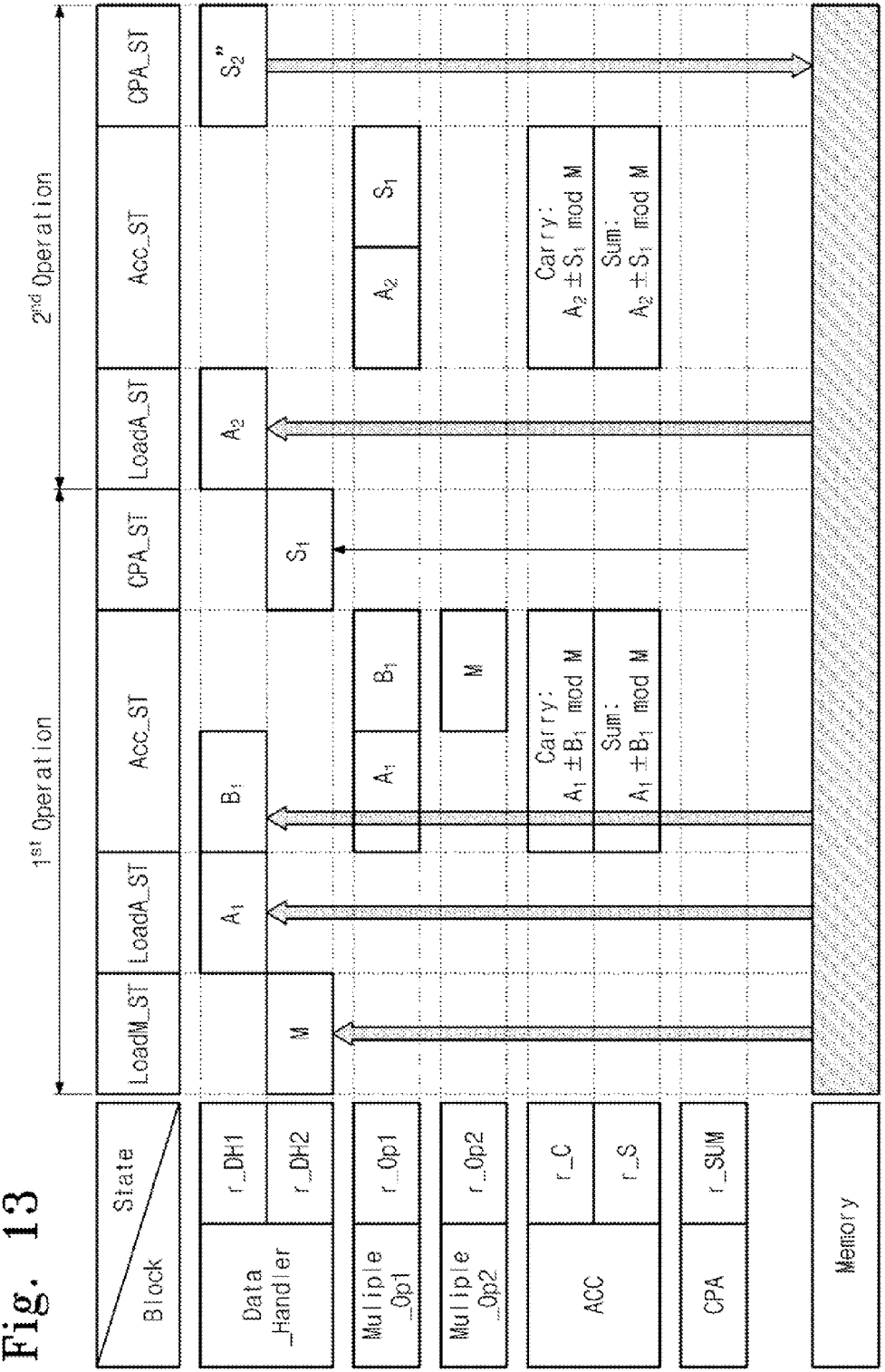
FIG. 13 illustrates case 4 of a modular addition/subtraction operation in the modular arithmetic unit illustrated in FIG. 10.

FIG. 13 illustrates case 4 of the modular addition/subtraction operation in the modular arithmetic unit 200 illustrated in FIG. 10. Case 4 includes successive modular addition/subtraction operations $S_1=A_1\pm B_1$ mod M and $S_2''=A_2\pm S_1$ mod M. Except for loading the $B_1$ and $A_2$ operands from memory into the r_DH1 register of the data handler 250 during the first Acc_ST state and second LoadA_ST state, respectively, the state descriptions of the remaining states labeled in FIG. 13 are similar to identical states in FIG. 11, and thus a repetitive description thereof will be omitted.

Figure 14:
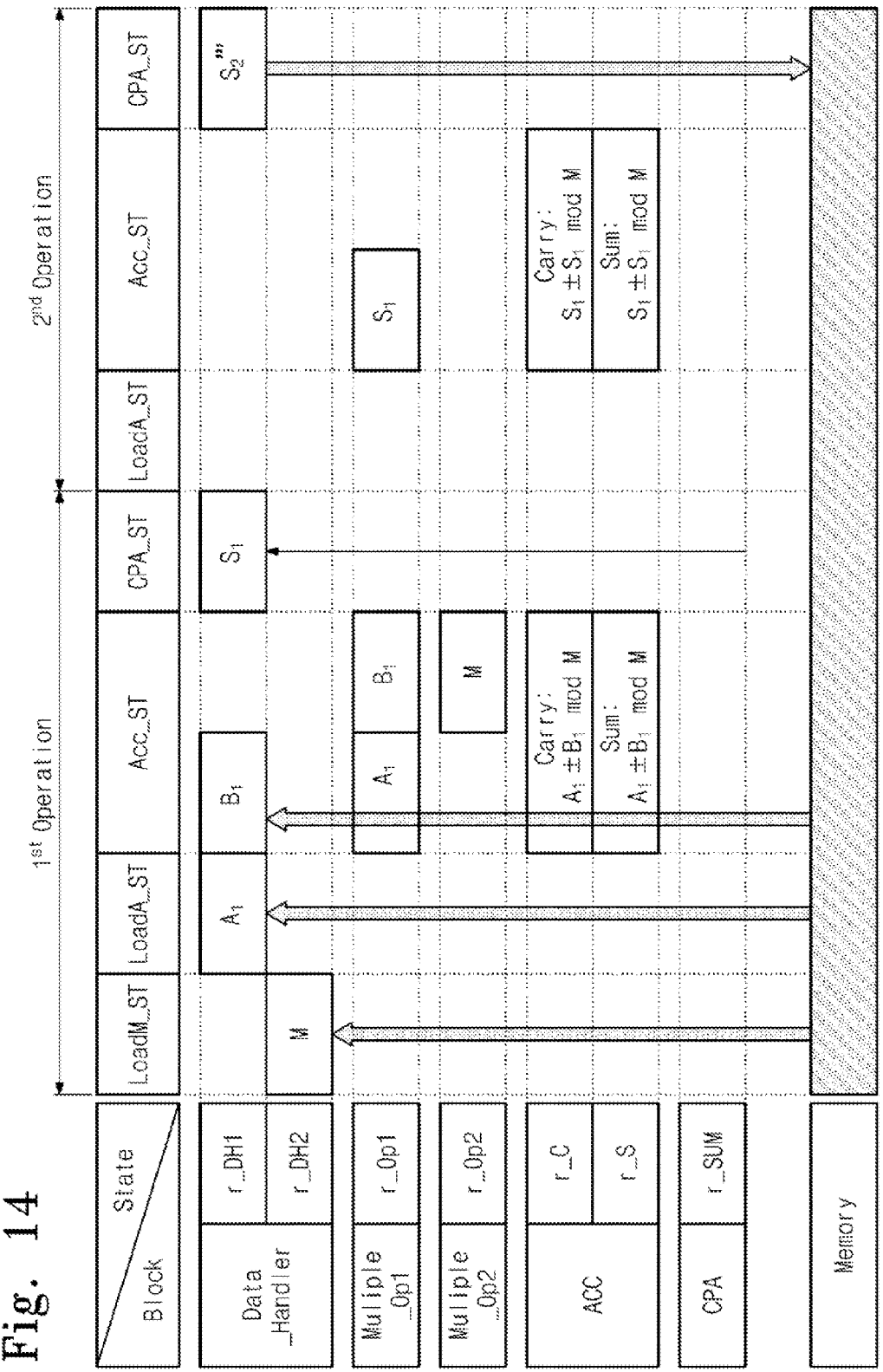
FIG. 14 illustrates case 5 of a modular addition/subtraction operation in the modular arithmetic unit illustrated in FIG. 10.

FIG. 14 illustrates case 5 of the modular addition/subtraction operation in the modular arithmetic unit 200 illustrated in FIG. 10. Case 5 includes successive modular addition/subtraction operations $S_1=A_1\pm B_1$ mod M and $S_2'''=S_1\pm S_1$ mod M. Except for loading the $B_1$ operand from memory into the r_DH1 register of the data handler 250 during the first Acc_ST state, the state descriptions of the remaining states labeled in FIG. 13 are similar to identical states in FIG. 11, and thus a repetitive description thereof will be omitted.

FIG. 15 is a table that compares a modular operation result of modular arithmetic unit 200 of an embodiment of the inventive concept with a modular operation result of the conventional modular arithmetic unit 100, for case 3 of Montgomery multiplication and cases 3 to 5 of modular addition/subtraction. FIG. 15 reflects the number of memory accesses occurring in the $2^{nd}$ operation for the conventional modular arithmetic unit 100 in the row labeled "Prior Art", and for a modular arithmetic unit 200 of an embodiment of the inventive concept in the row labeled "Present Invention". Referring to FIG. 15, the modular arithmetic unit 200 can reduce the number of memory accesses as compared with the conventional modular arithmetic unit 100. The modular arithmetic unit 200 can operate hardware at a higher speed by reducing the number of operating cycles involved with a memory access.

Figure 16:
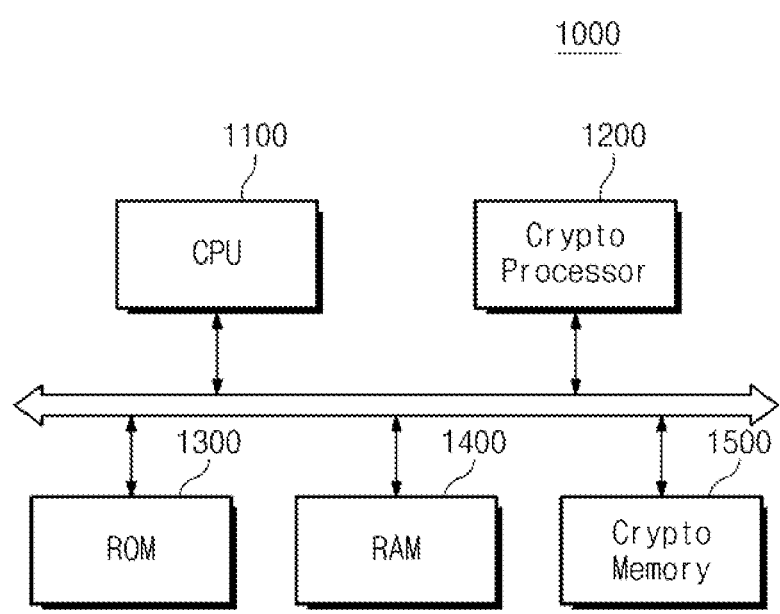
FIG. 16 is a block diagram illustrating a secure system including a crypto processor having a modular arithmetic unit in accordance with embodiments of the inventive concept.

FIG. 16 is a block diagram illustrating a secure system including a crypto processor having a modular arithmetic unit in accordance with embodiments of the inventive concept. Referring to FIG. 16, the secure system 1000 includes a central processing unit (CPU) 1100, a crypto processor 1200, a ROM 1300, a RAM 1400 and a crypto memory 1500.

The CPU 1100 controls an overall operation of the secure system 1000. The crypto processor 1200 decodes commands for code, certification and electronic signature under control of the CPU 1100 and processes data. The crypto processor 1200 includes the modular arithmetic unit 200 illustrated in FIG. 10. The ROM 1300 and the RAM 1400 store data necessary for operating the secure system 1000. The crypto memory 1500 stores data necessary for operating the crypto processor 1200.

As compared with a conventional secure system, when performing a modular operation, the secure system 1000 in accordance with an embodiment of the inventive concept can more safely process data by reducing the number of accesses of the crypto memory 1500.

In comparison with a conventional modular arithmetic unit and secure system, a modular arithmetic unit according to an embodiment of the inventive concept and a secure system including the modular arithmetic unit can reduce the number of memory accesses and can perform a modular operation with fewer cycles through resource sharing and a small hardware addition.

A modular arithmetic unit according to an embodiment of the inventive concept can reduce power consumption by reducing hardware size through hardware sharing.

A modular arithmetic unit according to an embodiment of the inventive concept can reduce power consumption by reducing the use of an external storage device.

A modular arithmetic unit according to an embodiment of the inventive concept can reduce data outflow due to data movement by reducing the use of an external storage device.

The foregoing is illustrative of embodiments of the inventive concept and is not to be construed as limiting thereof. Although a few exemplary embodiments of the inventive concept have been described, those skilled in the art will readily appreciate that many modifications are possible in the exemplary embodiments without materially departing from the novel teachings of embodiments of the present invention. Accordingly, all such modifications are intended to be included within the scope of embodiments of the present invention as defined in the following claims, with equivalents of the claims to be included therein

What is claimed is:

1. A modular arithmetic unit comprising:
   a first input generator configured to receive first data to generate a first operand;
   a second input generator configured to receive second data to generate a second operand;
   an accumulator configured to perform an accumulate/shift operation on the first and second operands respectively received from the first input generator and the second input generator to output a carry and sum;
   a carry propagation adder configured to add the carry and the sum received from the accumulator to output a result; and
   a data handler configured to receive external data or the result from the carry propagation adder and output the first data and the second data,
   wherein the modular arithmetic unit performs a plurality of modular multiplication operations and a plurality of modular addition/subtraction operations,
   wherein a result of a previous modular multiplication operation is stored in the data handler to be used in a subsequent modular multiplication operation, and
   wherein a result of a previous modular addition/subtraction operation is stored in the data handler to be used in a subsequent modular addition/subtraction operation.

2. The modular arithmetic unit of claim 1, wherein the first input generator comprises:
   a first operand multiplexer configured to select one of the first data and a previous first data;
   a first operand register configured to store the selected first data; and
   a first operand logic configured to output a multiple of the stored first data, and
   wherein the second input generator comprises:
   a second operand multiplexer configured to select one of the second data and a previous second data;
   a second operand register configured to store the selected second data; and
   a second operand logic configured to output a multiple of the stored second data.

3. The modular arithmetic unit of claim 2, wherein when performing a Montgomery multiplication operation, the first operand is a product of a multiplicand by a multiplier, and the second operand is product of a modulus by a share value.

4. The modular arithmetic unit of claim 3, wherein the Montgomery multiplication operation comprises performing a first Montgomery multiplication operation and a second Montgomery multiplication operation without a change of modulus,
   wherein a result of the first Montgomery multiplication operation is stored in an internal register of the data handler, and, the result stored in the internal register of the data handler is used as the multiplicand for the second Montgomery multiplication operation.

5. The modular arithmetic unit of claim 2, wherein the first operand of a modular addition/subtraction operation is '1' multiple or '−1' multiple with respect to summand/minuend and addend/subtrahend and the second operand is '1' multiple or '−1' multiple with respect to a modulus.

6. The modular arithmetic unit of claim 5, wherein the modulus addition/subtraction operation comprises performing a first modular addition/subtraction operation and a second modular addition/subtraction operation without a change of modulus,
   wherein a result of the first modular addition/subtraction operation is stored in an internal register of the data handler, and the result stored in the internal register of the data handler is used as addend or subtrahend for the second modular addition/subtraction operation.

7. The modular arithmetic unit of claim 5, wherein the modulus addition/subtraction operation comprises performing a first modular addition/subtraction operation and a second modular addition/subtraction operation without a change of modulus,
   wherein a result of the first modular addition/subtraction operation is stored in an internal register of the data handler, and the result stored in the internal register of the data handler is used as summand or minuend for the second modular addition/subtraction operation.

8. The modular arithmetic unit of claim 5, wherein the modulus addition/subtraction operation comprises performing a first modular addition/subtraction operation and a second modular addition/subtraction operation without a change of modulus,
   wherein a result of the first modular addition/subtraction operation is stored in an internal register of the data handler, and
   the result stored in the internal register of the data handler is used as summand/minuend and addend/subtrahend for the second modular addition/subtraction operation.

9. The modular arithmetic unit of claim 1, wherein the accumulator comprises:
   an accumulation logic circuit configured to receive the first and second operands to perform an accumulate/shift operation; and
   an accumulation register configured to store the carry and the sum generated during an operation of the accumulation logic circuit.

10. The modular arithmetic unit of claim 1, wherein the carry propagation adder comprises an adder configured to add the carry and the sum and output the result thereof.

11. The modular arithmetic unit of claim 1, wherein the data handler comprises:
    a first data handler logic circuit configured to receive external data or the result from the carry propagation adder, to shift the result, and output one of the external data, the result, or the shifted data;
    a second data handler logic circuit configured to receive the external data or the result from the carry propagation adder, to shift the result, and output one of the external data, the result, or the shifted data;
    a first data handler register configured to store an output value of the first data handler logic circuit;
    a second data handler register configured to store an output value of the first data handler logic circuit; and
    a data handler multiplexer configured to select one of values stored in the first and second data handler registers,
    wherein an output value of the data handler multiplexer is output to the first data and a value stored in the second data handler register is output to the second data.

12. The modular arithmetic unit of claim 11, wherein at least one of the values stored in the first and second data handler registers is output as an operation result.

13. A secure system comprising:
    a central processing unit;
    a ROM and a RAM configured to store data;

a crypto processor that includes a modular arithmetic unit configured to perform modular arithmetic;
a crypto memory configured to store data for the crypto processor,
wherein the modular arithmetic unit comprises:
a first input generator configured to receive first data to generate a first operand;
a second input generator configured to receive second data to generate a second operand;
an accumulator configured to perform an accumulate/shift operation on the first and second operands respectively received from the first input generator and the second input generator to output a carry and sum;
a carry propagation adder configured to add the carry and the sum received from the accumulator to output a result value; and
a data handler configured to receive data from the crypto processor or the result value from the carry propagation adder to output the first and second data,
wherein the data handler outputs m-bit data stored in registers of the data handler to the crypto memory when the result value is a final result of an operation,
wherein the modular arithmetic unit performs a plurality of modular multiplication operations and a plurality of modular addition/subtraction operations,
wherein a result of a previous modular multiplication operation is stored in the data handler to be used in a subsequent modular multiplication operation, and
wherein a result of a previous modular addition/subtraction operation is stored in the data handler to be used in a subsequent modular addition/subtraction operation.

14. A modular arithmetic unit comprising:
a data handler that includes a first data handler logic circuit configured to receive data from a plurality of inputs, and to shift and output the data, a second data handler logic circuit configured to receive data from a plurality of inputs, and to shift and output the data, a first data handler register configured to store an output of the first data handler logic circuit, a second data handler register configured to store an output of the second data handler logic circuit, and a data handler multiplexer configured to select one of values stored in the first and second data handler registers, wherein an output of the data handler multiplexer is output to a first data and a value stored in the second data handler register is output to a second data;
a first input generator that includes a first operand multiplexer configured to select one of the first data and a stored previously selected first data, a first operand register configured to store the selected first data, and a first operand logic configured to output a multiple of the stored first data as a first operand; and
a second input generator that includes a second operand multiplexer configured to select one of the second data and a stored previously selected second data, a second operand register configured to store the selected second data, and a second operand logic configured to output a multiple of the stored second data as a second operand.

15. The modular arithmetic unit of claim 14, further comprising:
an accumulator that includes an accumulation logic circuit configured to receive the first and second operands to perform an accumulate/shift operation, and an accumulation register configured to store the carry and the sum generated during an operation of the accumulation logic circuit.

16. The modular arithmetic unit of claim 15, further comprising a carry propagation adder that includes an adder configured to add the carry and the sum and output the result thereof.

17. The modular arithmetic unit of claim 16, wherein the first data handler logic circuit receives one of external data or the result from the carry propagation adder, shifts the result, and outputs any one of the external data, the result, or the shifted data, and the second data handler logic circuit wherein the first data handler logic circuit receives one of external data or the result from the carry propagation adder, shifts the result, and outputs any one of the external data, the result, or the shifted data.

18. The modular arithmetic unit of claim 14, wherein when performing a Montgomery multiplication operation, the first operand is a product of a multiplicand by a multiplier, and the second operand is product of a modulus by a share value,
wherein the Montgomery multiplication operation comprises performing a first Montgomery multiplication operation and a second Montgomery multiplication operation without a change of modulus, and
wherein a result of the first Montgomery multiplication operation is stored in an internal register of the data handler, and, the result stored in the internal register of the data handler is used as the multiplicand for the second Montgomery multiplication operation.

19. The modular arithmetic unit of claim 14, wherein the first operand of a modular addition/subtraction operation is '1' multiple or '−1' multiple with respect to summand/minuend and addend/subtrahend and the second operand is '1' multiple or '−1' multiple with respect to a modulus,
wherein the modulus addition/subtraction operation comprises performing a first modular addition/subtraction operation and a second modular addition/subtraction operation without a change of modulus,
wherein a result of the first modular addition/subtraction operation is stored in an internal register of the data handler, and
the result stored in the internal register of the data handler is used as one of a addend or subtrahend for the second modular addition/subtraction operation, a summand or minuend for the second modular addition/subtraction operation, or a summand/minuend and addend/subtrahend for the second modular addition/subtraction operation.

* * * * *